United States Patent Office 2,756,223
Patented July 24, 1956

2,756,223
METAL-CONTAINING AZO DYESTUFFS

Guido Schetty, Basel, Switzerland, assignor to J. R. Geigy A. G., Basel, Switzerland, a Swiss firm No Drawing. Application March 27, 1953,
Serial No. 345,261

Claims priority, application Switzerland April 7, 1952

7 Claims. (Cl. 260—145)

The present invention concerns the production of complex heavy metal-containing o.o'-dihydroxy monoazo dyestuffs which have no sulphonic acid groups and which contain at least one sulphonic acid amide group. It is also concerned with the attainment of fast dyeings on wool and fibres similar thereto with these metal-containing dyestuffs under conditions which protect the fibres.

It has been found that valuable metallised dyestuffs are obtained if compounds of complex forming heavy metals which give off metal are reacted with monoazo dyestuffs of the general formula:

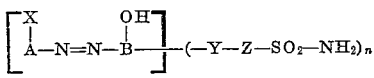

In this formula: X represents a hydroxyl group in the o-position to the azo group or a substituent which can be converted into such a hydroxyl group, A represents a radical of the benzene series, B represents a radical of an azo component coupling in a position next to the hydroxyl group, Y represents a bridging member of the formula CO, SO₂, or SO₂—NR where R represents a lower alkyl radical, Z represents a radical of the benzene series and $n$ represents a low whole number.

Both A and B may be further substituted, but they may not contain any strongly acid water solubilising groups however. As such are to be understood those which form salts with alkali carbonates while giving off carbon dioxide, in particular the sulphonic acid and carboxyl groups. The bridging member Y must be bound to the radical A or B; it is advantageous if it is bound to an aromatic ring.

The metal-containing dyestuffs according to the present invention are characterised therefore by the presence of at least one arylsulphonic acid amide group which is bound to the actual chromophore system by an electron negative bridging member, and by the absence of strong acid salt-forming groups.

A preferred group of dyestuffs according to the present invention corresponds to the formula:

wherein M is a heavy metal selected from the group consisting of Cr and Co, D and D' are coordinated unsulphonated monoazo dyestuffs of the formula:

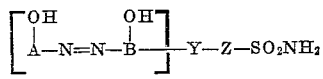

wherein A represents a radical of the benzene series containing the hydroxy group in ortho-position to the azo group, B represents the radical of a member selected from the group consisting of phenolic, naphtholic and enolic coupling components, containing the hydroxy group in ortho-position to the azo group, Y represents a bridging member selected from the group consisting of —CO—, —SO₂—, and —SO₂—NR—, R meaning a low molecular alkyl radical, and Z represents a radical of the benzene series.

The diazo components usual in azo chemistry which contain no acid water-solubilising groups can be used for the production of the monoazo dyestuffs, e. g. o-amino-hydroxybenzene compounds substituted with halogen, alkyl, nitro, acyl and carbalkoxy-amino, aryl and alkyl sulphone groups. Diazo components with the grouping —Y—Z—SO₂—NH₂ as a substituent which can be used are, e. g. 4-hydroxy-3-amino-diphenyl sulphone or -ketone-3'-sulphonic acid amide, or -ketone-4'-methyl-3'-sulphonic acid amide, 5-chloro- or 5-nitro-4-hydroxy-3-amino-diphenyl sulphone or -ketone-3'-sulphonic acid amide or 4-hydroxy-3-aminobenzene-1-sulphonic acid-(4'-sulphamido-phenyl)-ethyl amide. These compounds can be produced for example from 4-chloro-3-nitro-diphenyl sulphones or ketones or from 4-chloro-3-nitro-benzene-1-sulphonic acid-N-alkylanilide-sulphonic acids. The diazo components required are obtained by first sulphonating if necessary and then transforming the sulphonic acid group into the sulphochloride group with the aid of phosphorus pentachloride or chlorosulphonic acid, replacing the chlorine atom by the amino group with ammonia or ammonium carbonate under mild conditions, exchanging the halogen atom located in the o-position to the nitro group for a hydroxyl group by using strong alkalies in the warm and reducing the nitro group to the amino group. The o-alkoxy compounds corresponding to the o-hydroxyaminobenzene compounds listed are employed for example, as diazo components which have an o-substituent which can be converted into the hydroxyl group. They are obtained from suitably substituted o-nitrochlorobenzene compounds by the action of alcoholic alkali and reduction of the nitro group to the amino group.

Those coupling components usual in azo chemistry can be used which couple in a neighbouring position to an aromatically bound or enolic hydroxyl group and contain no sulphonic acid and carboxyl groups, e. g. phenols, naphthols, acylacetic acid aryl amides, 5-pyrazolones, 2.4-dihydroxyquinolines, etc., which may contain the usual non-ionogenic substituents. Azo components with the grouping —Y—Z—SO₂—NH₂ as substituent can be obtained for example by starting from 3-nitro-diphenyl sulphones or ketones after sulphonating over the corresponding sulphochloride and sulphonic acid amide by reduction of the nitro to the amino group and acetoacetylating these with diketene or diazotising them and converting the diazo group into the hydrazino group by the usual methods, and condensing with β-ketocarboxylic acid esters to form 5-pyrazolones. Also it is possible, for example to react suitably substituted tosyloxy-naphthalene-sulphonic acid chlorides with alkylamino-benzene sulphonic acids; convert the sulphonic acid group by way of the sulphonic acid chloride into the sulphamide group and finally saponify the tosyloxy to the hydroxyl group.

The diazo components usable according to the present invention are diazotised by the usual methods in mineral acid solution or suspension with sodium nitrite. The coupling is performed according to the azo component in an alkaline to weakly acid agent, if necessary in the presence of auxiliary agents such as pyridine bases. In this coupling process the components should be so chosen that the group Y—Z—SO₂—NH₂ appears at least once in the azo dyestuff.

The salts of di- or tri-valent heavy metals of the iron group, copper and chromium are suitable for the formation of the metal complex. The complex chromium and cobalt compounds are particularly valuable for dyeing purposes. They are obtained by the usual methods by reacting aqueous solutions of the salts of trivalent chromium or of di- or tri-valent cobalt on o.o'-dihydroxyazo dyestuffs usable according to the present invention. The reaction is performed in aqueous or organic solution or suspension under such conditions that at least 1 atom of heavy metal forms a complex bond with 2 mols of dyestuff. Treatment in an aqueous agent with alkali salts of disalicylato chromiates is particularly advantageous for the production of complex chromium compounds. From the monoazo dyestuffs (D) usable according to the present invention also mixed metal complex compounds of the type D—Me—D' can be produced, wherein D' represents any o.o'-dihydroxyazo dyestuff without acid water-solubilising groups which is different from D and wherein Me represents chromium or cobalt. On the other hand, it is advantageous first to produce the complex copper compounds from the o-alkoxy-o'-hydroxy-azo dyestuffs usable according to this invention and in so doing replacing the alkoxy group by known methods by the hydroxyl group. The chromium and cobalt compounds which are more valuable for dyeing purposes are obtained therefrom by the usual methods by removal of the copper for example with strong mineral acids such as hydrochloric acid, or with complex acids such as ethylenediamine-tetra-acetic acid whereupon the o.o'-dihydroxyazo dyestuffs are chromed or treated with cobalt. The chromium and cobalt complexes can also be obtained direct from the o-alkoxy-o'-hydroxyazo dyestuffs by heating with chromium or cobalt salts in solvents such as glycol or acetamide. In this case, the metallising is performed advantageously at temperatures between 140–150° C. The o.o'-dihydroxyazo dyestuffs can also be chromed on the wool according to the usual methods in a neutral to weakly acid bath with salts of hexavalent chromium; the non metal-containing dyestuffs are particularly suitable for the dyeing of wool according to the single bath chroming process.

The dyestuffs according to the present invention containing complexly bound chromium or cobalt are distinguished by very good affinity to wool and fibres similar thereto such as silk, casein fibres, superpolyamide and superpolyurethane fibres and can be dyed therefore even from neutral to weakly acid dyebaths under conditions which protect the fibres. They produce very level dyeings, yellow, orange, red, brown to grey according to the composition; the dyeings have good wet and light fastness properties and remarkable fastness to alkali. In general the new metal-containing dyestuffs differ from the known metal-containing dyestuffs which have a sulphonic acid amide group directly bound to the chromophore system by an improved drawing power from a neutral dyeing bath. In some cases they also have a better fastness to acid milling.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

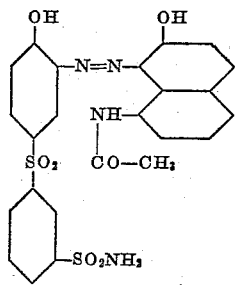

Chromium complex 32.8 parts of 2-amino-1-phenol-4-phenylsulphone-3'-sulphonic acid amide are dissolved in 130 parts of hot water with 15 parts by volume of 10 N-caustic soda lye, 6.9 parts of sodium nitrite (as 33% solution) are added and after cooling, the solution is added dropwise while stirring to a solution of 35 parts of concentrated hydrochloric acid in 200 parts of water. The clay-yellow coloured diazonium compound precipitates in a fine crystalline form. Sodium bicarbonate is added until there is a neutral reaction to Congo red and the suspension of the diazonium compound is then poured at 0–3° into a solution of 21.1 parts of 1-acetylamino-7-hydroxynaphthalene in 210 parts of 0.5 N-caustic soda lye and 150 parts by volume of 10% sodium carbonate solution. On completion of the dyestuff formation, the dyestuff is precipitated with sodium chloride, filtered off, pasted in 800 parts of water and, after the addition of 200 parts of a solution of ammonium chromo-salicylate (corresponding to 7.6 parts of $Cr_2O_3$), is boiled for 20 hours under reflux. The chromium complex precipitates as a resinous substance. After cooling, the chromium complex dyestuff which has solidified into a brittle mass is filtered off and dried. The dark blue powder which is obtained dissolves well in water after being mixed with trisodium phosphate. The new dyestuff dyes wool from a neutral to weakly acid bath in grey shades which have excellent fastness to light, washing and milling. Dyestuffs of a somewhat more green shade but with otherwise similar properties are obtained if 22.8 parts of 1-carbomethoxyamino-7-hydroxynaphthalene or 27.4 parts of 7-hydroxynaphthyl-(1)-carbamic acid-methoxyethyl ester are used instead of 21.1 parts of 1-acetylamino-7-hydroxynaphthalene.

2 - amino-1-phenol-4-phenylsulphone-3'-sulphonic acid amide can be obtained as follows:

4 - chloro - 3-nitro - 1.1'-diphenylsulphone-3'-sulphonic acid is converted into 4-chloro-3-nitro-1.1'-diphenylsulphone-3'-sulphonic acid chloride by heating with phosphorus pentachloride and then converted into 4-chloro-3-nitro-1.1'-diphenylsulphone-3'-sulphonic acid amide by reacting with dry ammonia gas in benzene. The chlorine atom is exchanged for the hydroxyl group by heating with diluted caustic soda lye and finally the nitro group is converted into the amino group by reduction with sodium sulphide.

*Example 2*

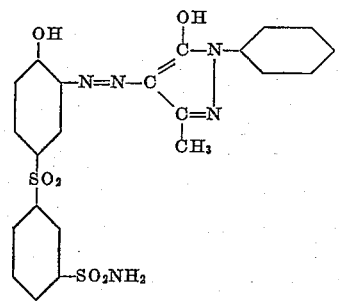

Chromium complex 32.8 parts of 2-amino-1-phenol-4-phenylsulphone-3'-sulphonic acid amide are diazotised as described in Example 1, neutralised with sodium bicarbonate and poured at 0–5° into a solution of 18.4 parts of 1-phenyl-3-methyl-5-pyrazolone and 20 parts of sodium carbonate in 200 parts of water. On completion of the dyestuff formation, the dyestuff is salted out and filtered off. It is then suspended in 1000 parts of water, 200 parts of a solution of ammonium chromo-salicylate (corresponding to 7.6 parts of $Cr_2O_3$) are added and the whole is boiled for 24 hours under reflux. The chromium complex dyestuff which is formed is precipitated with sodium chloride, filtered off after cooling and dried. The red-brown powder so obtained dyes wool from a neutral or weakly acid bath in orange shades which have good fastness to washing, milling and sea water and excellent fastness to light.

Example 3

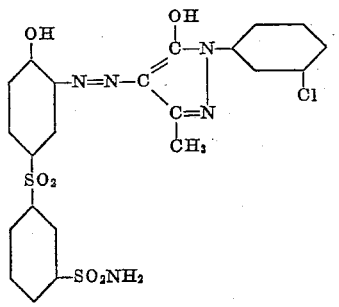

Cobalt complex 32.8 parts of 2-amino-1-phenol-4-phenylsulphone-3'-sulphonic acid amide are diazotised as described in Example 1 and coupled with 21.9 parts of 1-(3'-chlorophenyl)-3-methyl-5-pyrazolone as described in Example 2. The dyestuff which has been precipitated with sodium chloride and filtered off is suspended in 800 parts of water and, after adding 60 parts of cobalt acetate solution (corresponding to 3.54 parts of Co), is heated for 3 hours at 80–90°. An alkaline reaction is obtained by the addition of sodium carbonate and it is heated for a further 2 hours at 80–90°, 700 parts of saturated sodium chloride solution are added and the cobalt-containing dyestuff which precipitates is filtered off hot and dried. A yellow-brown powder is thus obtained which dyes wool from a neutral or weakly acid bath in orange-yellow shades which have excellent fastness to light and very good fastness to washing and milling.

Example 4

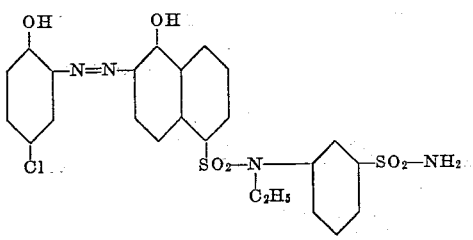

Chromium complex 14.4 parts of 4-chloro-2-amino-1-phenol are dissolved in 17 parts of concentrated hydrochloric acid and 100 parts of hot water and, after cooling by adding ice, are diazotised at 0–3° with a 5 N-sodium nitrite solution. The diazonium compound is neutralised with sodium bicarbonate and coupled at 0–3° with a solution of 42.8 parts of 1-naphthol-5-sulphonic acid-N-ethyl-N-phenylamide-3'-sulphonic acid amide and 8.4 parts of sodium hydroxide in 400 parts of water. On completition of the dyestuff formation, the dyestuff is precipitated by the addition of sodium chloride, suspended in 650 parts of water, 7 parts of the sodium salt of ricinoleic acid butyl ester-sulphonic acid and 110 parts of a solution of ammonium chromo-salicylate (corresponding to 4.2 parts of CR2O3) are added and the whole is boiled for 20 hours under reflux. An oily emulsion is formed, from which the chromium-containing dyestuff precipitates on cooling in a solid brittle mass. The dyestuff is filtered off, dried and mixed with trisodium phosphate. The violet powder so obtained dyes wool from a weakly acetic acid bath in violet shades which have very good fastness to light, washing and milling.

1-naphthol-5-sulphonic acid-N-ethyl-N-phenylamide-3'-sulphonic acid amide can be produced as follows:

1-naphthol-5-sulphonic acid is esterified at a raised temperature and with an alkaline reaction with the aid of toluene sulphochloride in water and after intensive drying with phosphorus pentachloride in a suspension of phosphorus oxychloride is transformed into 1-tosylnaphthol-5-sulphonic acid chloride. The sulphonic acid chloride is condensed in pyridine with N-ethylaniline-3-sulphonic acid to form 1-tosyl-naphthol-5-sulphonic acid-N-ethyl-N-phenylamide-3'-sulphonic acid, the sulphonic acid group is converted with phosphorus pentachloride into the corresponding sulphonic acid chloride, the latter is condensed with ammonia gas into chlorobenzene and finally the tosyl radical is saponified by boiling with diluted caustic soda lye.

Example 5

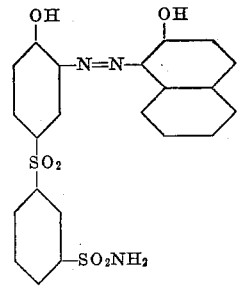

Cobalt complex 32.8 parts of 2-amino-1-phenol-4-phenylsulphone-3'-sulphonic acid amide are diazotised as described in Example 1 and after neutralising with sodium bicarbonate are poured at 2–5° into a solution of 15.1 parts of 2-hydroxynaphthalene, 11 parts by volume of 10 N-caustic soda lye and 12 parts of anhydrous soda in 500 parts of water. The dyestuff formation is complete after about 4 hours. The mixture is warmed to 40° and the dyestuff is precipitated by the addition of sodium chloride, filtered off and suspended in 700 parts of water at 80°; 60 parts of cobalt acetate solution (corresponding to 3.54 parts of Co) are added and the whole is heated for 3 hours at 80°. The solution is made alkaline by the addition of sodium carbonate and heated for a further 3 hours at 80°. Sodium chloride is added until the cobalt-containing dyestuff precipitates whereupon it is filtered off and dried. The new dyestuff, a dark wine red powder, dyes wool from a neutral or weakly acid bath in bluish-red shades which have excellent fastness to light and very good fastness to washing and milling.

Example 6

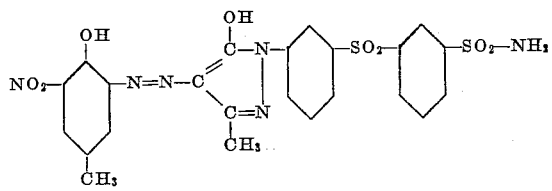

Chromium complex 16.8 parts of 6-nitro-4-methyl-2-amino-1-phenol are dissolved hot in 150 parts of water with 18 parts of concentrated hydrochloric acid and are diazotised at 2–5° by the addition of 6.9 parts of sodium nitrite (as 33% solution) and ice, and neutralised with sodium bicarbonate. 41.3 parts of 1-(3''-sulphonic acid amido-3'-phenyl-sulphonyl-phenyl)-3-methyl-5-pyrazolone are heated at 60° in 500 parts of water which contains 22 parts of sodium carbonate. The solution is cooled to 3° and the ice cold, neutralised diazonium compound is added. The temperature is kept at 0–5° until the dyestuff formation is complete, then the whole is heated to 65°, 800 parts of saturated sodium chloride solution are added, the precipitated dyestuff is filtered off while still warm and is washed with sodium chloride solution. The monoazo dyestuff is then suspended in 750 parts of hot water, 200 parts of a solution of ammonium chromo-salicylate (corresponding to 7:6 parts of $Cr_2O_3$) are added and the whole is boiled for 24 hours under reflux, after which it is allowed to cool and the precipitated chromium-containing dyestuff is filtered off and dried. A brown-red powder is thus obtained which dyes wool from a neutral or weakly acid bath in clear red shades which have very good fastness to washing, milling, seawater and light.

If, in the above example, the 6-nitro-4-methyl-2-amino-1-phenol is replaced by 14.4 parts of 4-chloro-2-amino-1-phenol or 17.8 parts of 4.6-dichloro-2-amino-1-phenol and the same procedure as described in Example 6 is followed, chromium-containing dyestuffs are obtained which dye in much more yellowish red shades but have otherwise the same fastness properties.

1 - (3" - sulphonic acid amido-3' - phenylsulphonyl-phenyl)-3-methyl-5-pyrazolone can be produced as follows:

1-nitrobenzene-3-sulphonic acid chloride is condensed with benzene to 3-nitro-1.1'-diphenyl sulphone according to the Friedel-Crafts process. 3-nitro-1.1'-diphenyl-sulphone-3'-sulphonic acid is obtained therefrom by sulphonation with 26% oleum. This is converted by heating with phosphorus pentachloride into 3-nitro-1.1'-diphenyl-sulphone-3'-sulphonic acid chloride and then, by treatment with ammonia gas in benzene into 3-nitro-1.1'-diphenylsulphone-3'-sulphonic acid amide. The nitro group is then reduced according to Béchamp and the 3-amino-1.1'-diphenylsulphone-3'-sulphonic acid amide is converted into 3-hydrazino-1.1'-diphenylsulphone-3'-sulphonic acid amide by diazotising and reducing the diazonium compound with sodium sulphite according to the usual methods. This hydrazino compound is finally condensed with acetoacetic ester.

*Example 7*

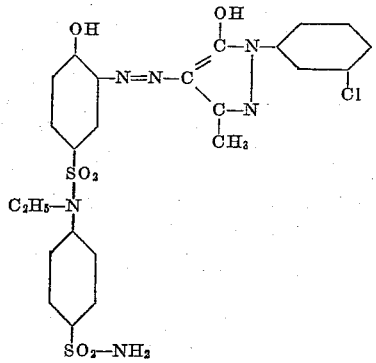

Chromium complex 37.1 parts of 2-amino-1-phenol-4-sulphonic acid-N-ethyl-N-phenylamide-4'-sulphonic acid amide are dissolved in 200 parts of water with 20 parts by volume of 10 N-caustic soda lye, a 33% sodium nitrite solution (corresponding to 6.9 parts of $NaNO_2$) is added and the whole is added dropwise at 5–10° to a solution of 40 parts of concentrated hydrochloric acid in 100 parts of water. The whole is neutralised with sodium bicarbonate, a further 3 parts of sodium bicarbonate are added and then an ice cold solution of 21.9 parts of 1-(3'-chlorophenyl)-3-methyl-5-pyrazolone and 12 parts by volume of 10 N-caustic soda lye in 300 parts of water is added. On completion of the dyestuff formation, the dyestuff is filtered off and chromed as described in Example 1. A red-brown powder is obtained which dyes wool from a neutral or weakly acid bath in very fast to light, washing and milling orange shades.

2-amino-1-phenol-4-sulphonic acid-N-ethyl-N-phenyl-amide-4'-sulphonic acid amide can be produced as follows:

1-chloro-2-nitrobenzene-4-sulphonic acid - N-ethyl-N-phenyl-amide-4'-sulphonic acid (obtained by condensing N-ethylaniline-4-sulphonic acid with 1-chloro-2-nitrobenzene-4-sulphonic acid chloride) is transformed into 1-chloro-2-nitrobenzene-4-sulphonic acid-N-ethyl-N-phenyl-amide-4'-sulphonic acid chloride by heating with phosphorus pentachloride. This is then converted into 1-chloro-2-nitrobenzene-4-sulphonic acid-N-ethyl-N-phenyl-amide-4'-sulphonic acid amide by reacting it with dry ammonia gas in benzene. The chlorine atom is exchanged for the hydroxyl group by heating with diluted caustic soda lye and finally the nitro group is converted into the amino group by reducing with sodium sulphide.

*Example 8*

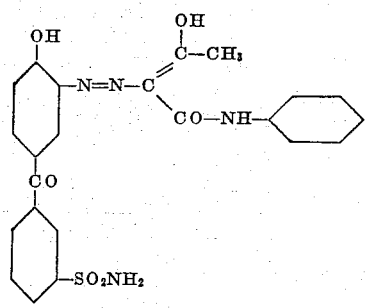

Chromium complex 29.2 parts of 2-amino-1-phenol-4-phenylketone-3'-sulphonic acid amide are dissolved in 300 parts of water with 20 parts by volume of 10 N-caustic soda lye, 20 parts by volume of 5 N-sodium nitrite solution are added and the whole is slowly added dropwise at 5–10° to a solution of 40 parts of concentrated hydrochloric acid and 100 parts of water. The yellow suspension of the diazonium compound is then neutralised with sodium bicarbonate, a further 3 parts of sodium bicarbonate are added and then a cold solution of 18.7 parts of acetoacetic anilide and 13 parts by volume of 10 N-caustic soda lye in 300 parts of water is added. The dyestuff formation is complete in about 3 hours. The dyestuff is precipitated by the addition of sodium chloride and filtered off. It is then pasted in 500 parts of water, and after adding 110 parts of a solution of ammonium chromosalicylate (corresponding to 4.2 parts of $Cr_2O_3$), the whole is boiled for 10 hours. 500 parts by volume of saturated sodium chloride solution are then added and the whole is again boiled for 2 hours after which it is allowed to cool and the chromium-containing dyestuff which precipitates is filtered off and dried. The dried dyestuff is a brown-yellow powder which dissolves well in hot water after being mixed with sodium carbonate. It dyes wool from a neutral or weakly acid bath in golden yellow shades which have very good fastness to milling and sea water.

2-amino-1-phenol-4-phenylketone-3'-sulphonic acid amide can be produced as follows:

1-chloro-2-nitrobenzene-phenylketone-3'-sulphonic acid, which is obtained by sulphonating 1-chloro-2-nitrobenzene-4-phenylketone, is heated with phosphorus pentachloride to form 1-chloro-2-nitrobenzene-4-phenylketone-3'-sulphonic acid chloride. This is then converted into 1-chloro-2-nitrobenzene-4-phenylketone-3'-sulphonic acid amide by reacting with dry ammonia in benzene. The chlorine atom is exchanged for the hydroxyl group by heating with diluted caustic soda lye and finally the nitro group is converted into the amino group by reduction with sodium sulphide.

Example 9

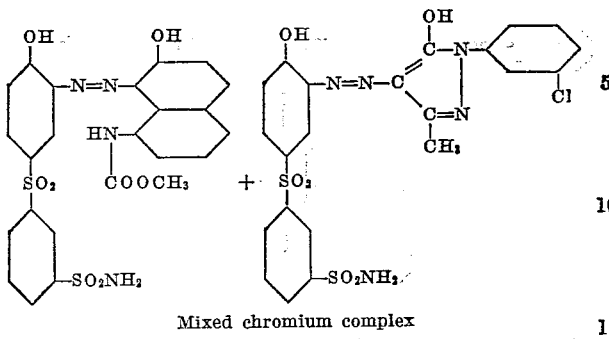

Mixed chromium complex 13.1 parts of 2-aminophenol-4-phenylsulphone-3'-sulphonic acid amide are diazotised as given in Example 1. The acid suspension of the diazonium compound is poured at 0–3° into a suspension of 5.86 parts of carbomethoxyaminonaphthol-(1.7) and 4.22 parts of 1-(3'-chlorophenyl)-3-methyl-5-pyrazolone in 600 parts of water. Ice and 14 parts of 25% ammonia are added and the whole is stirred at 0–3° until the coupling has been completed. The mixture of monoazo dyestuffs is then precipitated by the addition of sodium chloride and filtered off. The mixture of dyestuffs is then suspended in 500 parts of water, 50 parts of a solution of ammonium chromo-salicylate (corresponding to 1.9 parts of $Cr_2O_3$) are added and the whole is boiled for 16 hours. On cooling, the mixed complex precipitates onto the bottom of the vessel in the form of a crumbly mass, it is filtered off and dried. A brown-black powder is obtained which dyes wool from a neutral bath in dark brown shades which have very good fastness to light, washing and milling.

Dyestuffs with similar properties are obtained if the 2-amino-1-phenol-4-phenylsulphone-3'-sulphonic acid amide is replaced by 13.1 parts of 2-amino-1-phenol-4-phenylketone-3'-sulphonic acid amide or if the 1-(3'-chlorophenyl)-3-methyl-5-pyrazolone is replaced by 3.53 parts of 1-phenyl-3-methyl-5-pyrazolone.

Example 10

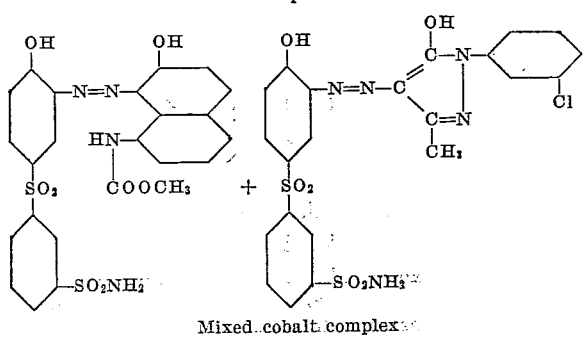

Mixed cobalt complex

The mixture of monoazo dyestuffs described in Example 9 is suspended in 500 parts of water, 2.7 parts of sodium carbonate are added, the whole is heated to 80° and then 27 parts of a cobalt acetate solution (corresponding to 1.6 parts of Co) are added and the whole is heated for 5 hours at 80–90°. After cooling, the precipitated dyestuff is filtered off and dried. The dark brown powder so obtained dyes wool from a neutral or weakly acid bath in yellowish brown shades which have very good fastness to washing, milling and light.

Example 11

1 part of the dyestuff according to Example 5 is dissolved in 4000 parts of water and 10 parts of Glaubers salt are added. 100 parts of wool are entered at 50°, the bath is brought to the boil within 45 minutes and kept boiling for 1½ hours while working the goods well, after which they are rinsed and dried. The wool so dyed in bluish-red shades is extremely fast to milling, alkali, sea water and light.

Additional dyestuffs according to the present invention are exemplified in the table which follows:

TABLE

| | Diazo component | Coupling component | Metal | Colour of the metal complex on wool |
|---|---|---|---|---|
| 1. | 2-amino-1-phenol-4-phenylsulphone-3'-sulphamide. | 1-(3'-chlorophenyl)-3-methyl-5-pyrazolone. | Cr | orange. |
| 2. | 2-amino-1-phenol-4-phenylsulphone-3'-sulphamide. | 3.4-dimethyl-1-phenol. | Cr | reddish-brown. |
| 3. | 2-amino-1-phenol-4-phenylsulphone-3'-sulphamide. | 1-phenyl-3-carboxylic acid amido-5-pyrazolone. | Cr | red. |
| 4. | 2-amino-1-phenol-4-phenylsulphone-3'-sulphamide. | 2-naphthol. | Cr | violet. |
| 5. | 2-amino-1-phenol-4-phenylsulphone-3'-sulphamide. | 1-(3'-chlorophenyl)-3-carboxylicacid amido-5-pyrazolone. | Cr | red. |
| 6. | 6-nitro-2-amino-phenol-4-phenylsulphone-3'-sulphamide. | 1-(3'-chlorophenyl)-3-methyl-5-pyrazolone. | Cr | brownish orange. |
| 7. | 6-nitro-2-aminophenol-4-phenylsulphone-3'-sulphamide. | 2-naphthol. | Cr | black. |
| 8. | 6-nitro-2-aminophenol-4-phenylsulphone-3'-sulphamide. | carbomethoxyaminonaphthol-(1.7). | Cr | grey. |
| 9. | 2-aminophenol-4-methylsulphone. | 1-naphthol-5-sulphonic acid ethylanilide-3'-sulphamide. | Cr | red-violet. |
| 10. | 4-nitro-2-aminophenol. | 1-naphthol-5-sulphonic acid ethylanilide-3'-sulphamide. | Cr | red violet. |
| 11. | 2-aminophenol-4-sulphethylanilide-4'-sulphamide. | acetylaminonaphthol-(1.7). | Cr | grey. |
| 12. | 2-aminophenol-4-sulphethylanilide-4'-sulphamide. | carbomethoxyaminonaphthol-(1.7). | Cr | Do. |
| 13. | 2-aminophenol-4-sulphethylanilide-4'-sulphamide. | do. | Co | violet-grey. |
| 14. | 2-aminophenol-4-phenylketone-3'-sulphamide. | 1-phenyl-3-methyl-5-pyrazolone. | Cr | orange. |
| 15. | 2-aminophenol-4-phenylketone-3'-sulphamide. | 1-phenyl-3-methyl-5-pyrazolone. | Co | yellow-orange. |
| 16. | 2-aminophenol-4-phenylketone-3'-sulphamide. | 1-(3'-chlorophenyl)-3-methyl-5-pyrazolone. | Cr | orange. |
| 17. | 2-aminophenol-4-phenylketone-3'-sulphamide. | 2-naphthol. | Cr | violet. |
| 18. | 2-aminophenol-4-phenylketone-3'-sulphamide. | do. | Co | violet-red. |
| 19. | 6-nitro-2-aminophenol-4-phenylketone-3'-sulphamide. | 3.4-dimethyl-1-phenol. | Cr | brown. |
| 20. | 2-amino-1-phenol-4-phenylsulphone-3'-sulphamide. | 2.4-dihydroxyquinoline. | Cr | red. |
| 21. | 2-amino-1-phenol-4-(4'-methylphenyl)-sulphone-3'-sulphamide. | 1-phenyl-3-methyl-5-pyrazolone. | Cr | orange. |
| 22. | 2-amino-1-phenol-4-(4'-methylphenyl)-ketone-3'-sulphamide. | 2-naphthol. | Co | bluish-red. |

What I claim is:
1. A complex heavy metal compound of the general formula

$$D—M—D'$$

wherein M is a heavy metal selected from the group consisting of Cr and Co, D and D' are co-ordinated unsulphonated monoazo dyestuffs of the formula:

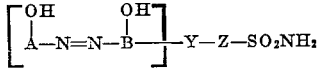

wherein A represents a radical of the benzene series containing the hydroxy group in ortho-position to the azo group, B represents the radical of a member selected from the group consisting of phenolic, naphtholic and enolic coupling components, containing the hydroxy group in ortho-position to the azo group, Y represents a bridging member selected from the group consisting of —CO—, —SO₂—, and —SO₂—NR—, R meaning a lower alkyl radical, and Z represents a radical of the benzene series.

2. A complex heavy metal compound of the general formula:

wherein M is a heavy metal selected from the group consisting of Cr and Co, D and D' are co-ordinated unsulphonated monoazo dyestuffs of the formula:

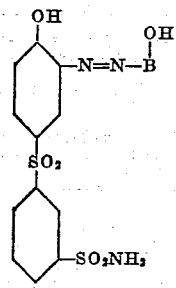

wherein B represents the radical of a member selected from the group consisting of phenolic, naphtholic and enolic coupling components, containing the hydroxy group in ortho-position to the azo group.

3. A complex cobalt compound of the formula:

wherein D and D' are co-ordinated monoazo dyestuffs of the formula:

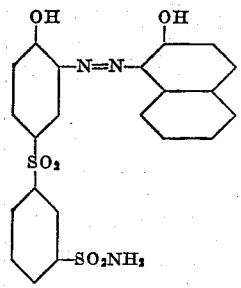

4. A complex chromium compound of the formula:

wherein D and D' are co-ordinated monoazo dyestuffs of the formula:

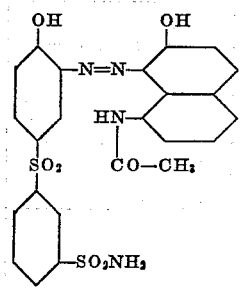

5. A complex chromium compound of the formula:

wherein D and D' are co-ordinated monoazo dyestuffs of the formula:

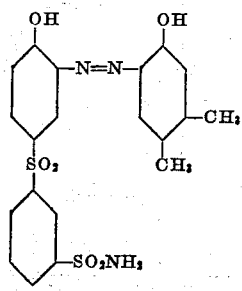

6. A complex chromium compound of the formula:

wherein D and D' are co-ordinated monoazo dyestuffs of the formula:

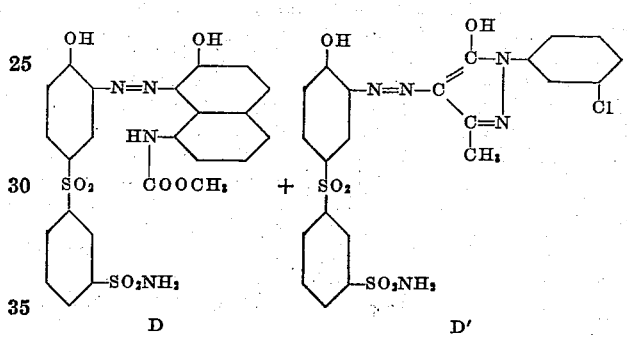

7. A complex chromium compound of the formula:

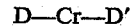

wherein D and D' are co-ordinated monoazo dyestuffs of the formula:

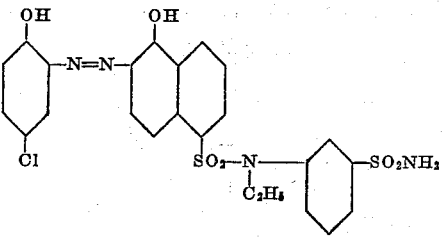

References Cited in the file of this patent
UNITED STATES PATENTS

| | | |
|---|---|---|
| 2,012,779 | Straub et al. | Aug. 27, 1935 |
| 2,151,518 | Krzikalla et al. | Mar. 21, 1939 |
| 2,317,733 | Conzetti et al. | Apr. 27, 1943 |
| 2,597,676 | Schetty | May 20, 1952 |
| 2,610,175 | Widmer et al. | Sept. 9, 1952 |
| 2,634,263 | Steinemann | Apr. 7, 1953 |